(12) United States Patent
Mousseau et al.

(10) Patent No.: US 9,612,803 B2
(45) Date of Patent: Apr. 4, 2017

(54) SYSTEM AND METHOD FOR USE OF A VIRTUAL ASSEMBLY BUILDER

(75) Inventors: Richard P. Mousseau, Stratham, NH (US); Mark Nelson, Bellevue, WA (US); Jon Richards, Hood River, OR (US); Troy Schulz, Forest Grove, OR (US); Keith Kelleman, Portland, OR (US); Mark Spotswood, Newton, MA (US); Jeff Berkowitz, Hillsboro, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 269 days.

(21) Appl. No.: 13/448,111

(22) Filed: Apr. 16, 2012

(65) Prior Publication Data

US 2013/0042239 A1 Feb. 14, 2013

Related U.S. Application Data

(60) Provisional application No. 61/476,216, filed on Apr. 15, 2011.

(51) Int. Cl.
*G06F 9/455* (2006.01)
*G06F 9/44* (2006.01)

(52) U.S. Cl.
CPC ............ *G06F 8/34* (2013.01); *G06F 9/45558* (2013.01); *G06F 2009/4557* (2013.01); *G06F 2009/45562* (2013.01)

(58) Field of Classification Search
CPC .................................. G06F 9/45533–9/45558
See application file for complete search history.

(56) References Cited

U.S. PATENT DOCUMENTS

| 8,156,301 | B1 | 4/2012 | Khandelwal |
| 8,176,486 | B2 | 5/2012 | Husain |
| 8,321,558 | B1 | 11/2012 | Sirota |
| 8,458,717 | B1 | 6/2013 | Keagy |

(Continued)

OTHER PUBLICATIONS

Virtual Appliances for Deploying and Maintaining Software Constantine Sapuntzakis David Brumley Ramesh Chandra Nickolai Zeldovich Jim Chow Monica S. Lam Mendel Rosenblum Published: 2003.*

(Continued)

*Primary Examiner* — Emerson Puente
*Assistant Examiner* — Paul Mills
(74) *Attorney, Agent, or Firm* — Tucker Ellis LLP (57) ABSTRACT

A virtual assembly builder for use in virtualization environments, which can be used as a tool for virtualizing installed components in a reference environment, modifying those components if necessary, and then deploying them into another/target environment. Using the virtual assembly builder, a user (e.g., an administrator) can capture the configuration and product/component binaries of existing software components into software appliance artifacts. Appliances can be grouped, and their relationships defined, into software assembly artifacts. Logical connections between appliances within an assembly can be reconfigured by a process of assembly editing. When a desired assembly configuration has been achieved, the assembly can be prepared for, and deployed into, the target environment.

23 Claims, 8 Drawing Sheets

(56) References Cited

U.S. PATENT DOCUMENTS

| | | |
|---|---|---|
| 8,468,535 B1 | 6/2013 | Keagy |
| 2006/0010176 A1* | 1/2006 | Armington ............... 707/204 |
| 2007/0078988 A1* | 4/2007 | Miloushev et al. ......... 709/227 |
| 2007/0234302 A1* | 10/2007 | Suzuki et al. ............. 717/126 |
| 2007/0294676 A1 | 12/2007 | Mellor |
| 2008/0201414 A1 | 8/2008 | Husain |
| 2008/0244595 A1* | 10/2008 | Eilam et al. ................ 718/104 |
| 2008/0263258 A1 | 10/2008 | Allwell |
| 2009/0006534 A1 | 1/2009 | Fries |
| 2009/0070752 A1 | 3/2009 | Alpern et al. |
| 2009/0094603 A1 | 4/2009 | Hiltgen |
| 2009/0113423 A1 | 4/2009 | Hiltgen et al. |
| 2009/0249284 A1* | 10/2009 | Antosz et al. ............. 717/104 |
| 2009/0249287 A1* | 10/2009 | Patrick ..................... 717/107 |
| 2009/0276771 A1 | 11/2009 | Nickolov |
| 2009/0300151 A1* | 12/2009 | Friedman et al. ........... 709/222 |
| 2009/0319688 A1 | 12/2009 | Mason |
| 2010/0095297 A1* | 4/2010 | Sethi et al. .................. 718/1 |
| 2010/0115174 A1 | 5/2010 | Akyol |
| 2010/0223383 A1 | 9/2010 | Salevan |
| 2010/0250744 A1 | 9/2010 | Hadad |
| 2010/0306599 A1 | 12/2010 | Cota-Robles |
| 2010/0306772 A1* | 12/2010 | Arnold et al. .................... 718/1 |
| 2011/0231455 A1* | 9/2011 | Joukov .................... G06F 8/60 707/822 |
| 2012/0072709 A1* | 3/2012 | Joukov ................ G06F 9/5077 713/1 |
| 2012/0151198 A1* | 6/2012 | Gupta ................ G06F 9/45558 713/2 |
| 2013/0276068 A1* | 10/2013 | Alwar .............................. 726/4 |

OTHER PUBLICATIONS

Virtual Appliances in the Collective: A Road to Hassle-Free Computing Constantine Sapuntzakis and Monica S. Lam Published: 2003.*

Galapagos: Automatically Discovering Application-Data Relationships in Networked Systems Kostas Magoutis, Murthy Devarakonda, Kiran Muniswamy-Reddy Published: 2007.*

Oracle Fusion Middleware: Developing Applications and Introspection Plug-ins for Oracle Virtual Assembly Builder Oracle p. 5-1-5-5 Published: Jun. 2013.*

* cited by examiner

Create Assembly - Step 3 of 4

Configure Properties

- ○ Name
- ○ Components
- ◉ Properties
- ○ Summary

Configure the introspection properties for each component you added in the prev...

Components:

🖳 wls_server_1

WLS Introspection Properties

| Name | Value |
|---|---|
| wlsHome* | |
| domainRoot* | |
| adminUser* | |
| adminPassword* | |

*Indicates required

[Help]  [< Back] [Next >] [Finish] [Cancel]

Create VM Templates for Appliance: ap_1 - Step 1 of 6

Confirm component template recreation

- ◉ Existing Templates
- ○ WLS Template Type
- ○ OVM Packages
- ○ Package Definitions
- ○ Image Location
- ○ Summary The following templates for this appliance have already been created. Only unregistered templates can be recreated. Check Recreate if needed.

Appliance Templates:

| Compenent | Template Type | Registered | Recreate |
|---|---|---|---|
| ap-1 | OEL | No | ☐ |

[Help]  [< Back] [Next >] [Finish] [Cancel]

| Create OVM Manager Connection: - Step 1 of 4

Connection

⊙ Connection
├─○ Test
├─○ Resource Pools
└─○ Network Bridges

ConnectionName: [DefaultConnectionName]

Host: [        ] Port: [    ]

User Name: [        ]

PassWord: [        ]

☐ Use Secure Connections

Secure Port: [        ]

Certificate: [        ] [Get Certificate]

VMM Version: [2.2 ▾]

VM Operations Timeout (seconds): [1000]

[Help]   [< Back] [Next >] [Finish] [Cancel]

FIG. 8

SYSTEM AND METHOD FOR USE OF A VIRTUAL ASSEMBLY BUILDER

CLAIM OF PRIORITY

This application claims the benefit of priority to U.S. Provisional Patent Application No. 61/476,216, titled "SYSTEM AND METHOD FOR CREATING OR RECONFIGURING A VIRTUAL SERVER IMAGE FOR CLOUD DEPLOYMENT", filed Apr. 15, 2011; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to enterprise computing and virtualization, and is particularly related to a system and method for use of a virtual assembly builder to create a virtual assembly of installed components, for deployment into another/target environment.

BACKGROUND

In the context of enterprise computing, increased operating costs, inefficient hardware utilization, and rapidly expanding data centers have made virtualization a compelling choice. Virtualization is the process of abstracting computer hardware resources, such as CPU, memory, storage, and network interfaces, from the operating system and applications. The hardware runs a virtualization software (e.g., a hypervisor) that enables the installation of multiple operating systems, each capable of running simultaneously and independently, in its own secure physical environment. In recent years, virtualization has begun to deliver on its promise to lower operating costs by increasing the utilization of hardware and reducing the overall amount of hardware required. However, it is often difficult to deploy and manage complex applications made up of multiple tiers and components—a process which typically involves a sequence of operational stages including testing, staging, and production. For example, details of network connectivity may change in the deployment environment; images may be specific to particular details of the deployment environment; and the proliferation of images can result in sprawl, creating maintenance overhead as each of the images must be patched at the operating system and application layers—all of which can lead to unanticipated costs and other problems.

SUMMARY

Disclosed herein is a virtual assembly builder (referred to in some instances as "Oracle Virtual Assembly Builder" or "OVAB") for use in virtualization environments, which can be used as a tool for virtualizing installed components in a reference environment, modifying those components if necessary, and then deploying them into another/target environment. Using the virtual assembly builder, a user (e.g., an administrator) can capture the configuration and product/component binaries of existing software components into software appliance artifacts. Appliances can be grouped, and their relationships defined, into software assembly artifacts. Logical connections between appliances within an assembly can be reconfigured by a process of assembly editing. When a desired assembly configuration has been achieved, the assembly can be prepared for, and deployed into, the target environment.

DETAILED DESCRIPTION

Disclosed herein is a virtual assembly builder (referred to in some instances as "Oracle Virtual Assembly Builder" or "OVAB") for use in virtualization environments, which can be used as a tool for virtualizing installed components (e.g., Oracle software components) in a reference environment, modifying those components if necessary, and then deploying them into another/target environment. Using the virtual assembly builder, a user (e.g., an administrator) can capture the configuration and product/component binaries of existing software components into software appliance artifacts. Appliances can be grouped, and their relationships defined, into software assembly artifacts. Logical connections between appliances within an assembly can be reconfigured by a process of assembly editing. When a desired assembly configuration has been achieved, the assembly can be prepared for, and deployed into, the target environment.

Virtual Assembly Builder

Figure 1:
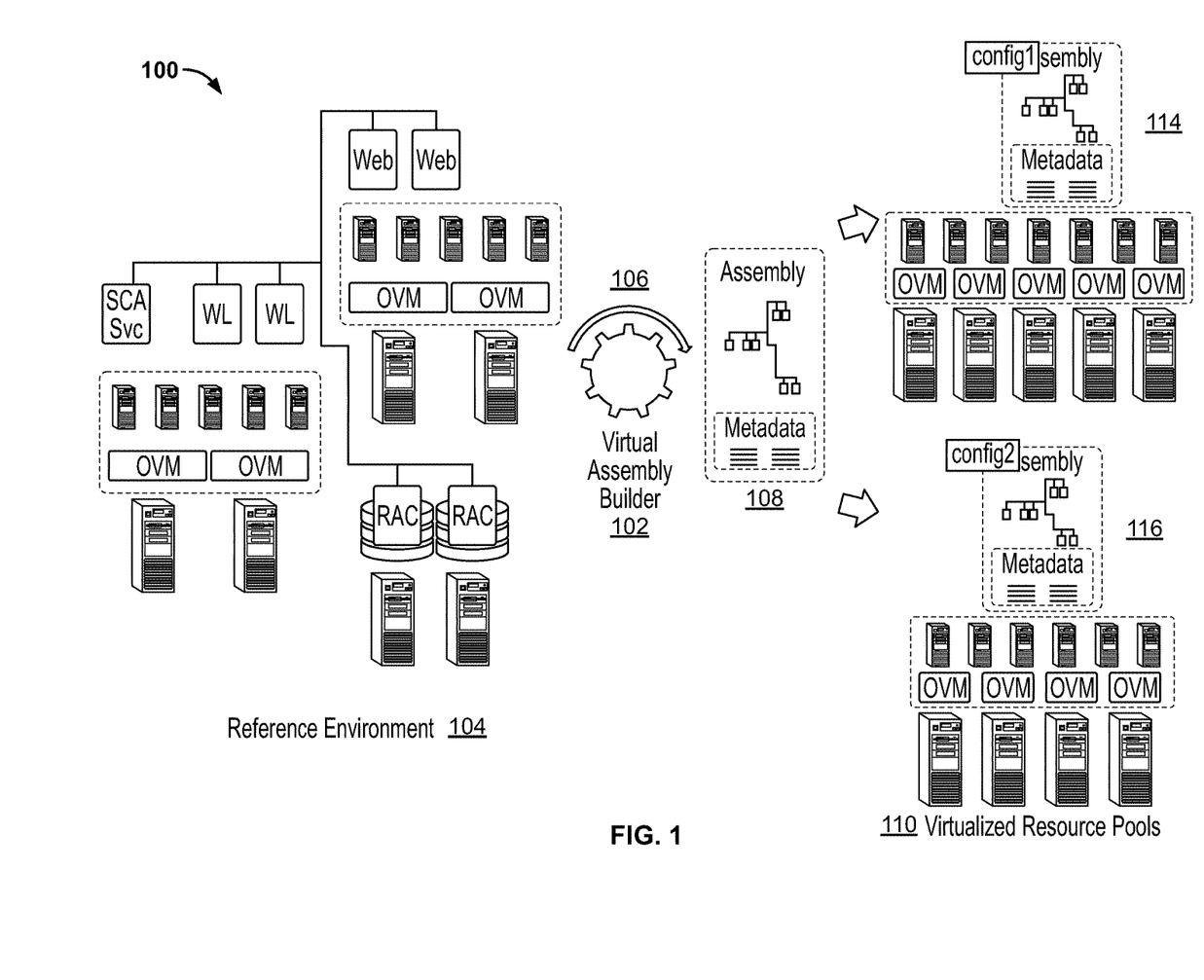
FIG. 1 shows an illustration of a virtual assembly builder environment, in accordance with an embodiment.

FIG. 1 shows an illustration of a virtual assembly builder environment 100, in accordance with an embodiment. As shown in FIG. 1, a virtual assembly builder 102, provided as a logic operated by a command-line or graphical user interface, is used to introspect a reference environment 104 including installed components (e.g., Oracle Fusion Middleware and Oracle Database software components), and prepare/edit 106 one or more assemblies 108, for subsequent deployment into one or more virtualized resource pools 110, according to various configurations 114, 116. As referred to herein, a software appliance (i.e., appliance) represents a single software component and its local execution environment. For example, depending on the choice of deployment technology, the component's local environment can be a single operating system instance (or, in some cases, a Java virtual machine instance without a conventional operating system). A software assembly (i.e., assembly) is a collection of interrelated software appliances that are dynamically configured to work together upon deployment onto a pool of hardware resources, and whose configuration can be orchestrated by deployment functionality. An assembly typically is representative of a multi-tier application topology comprised of 1-n virtual machines when deployed. Assemblies provide capabilities that are useful in a production environment, including:

Allow for the composition of appliances as well as external systems.

Externalize configuration in the form of metadata that can easily be customized.

Optionally define the start order of appliances to reflect interdependencies.

Provide a management domain which integrates into existing management infrastructure allowing for metadata definition, deployment, oversight and diagnostics.

Assemblies can also contain references to external systems, which are necessary to represent infrastructure such as databases, servers or security providers that either cannot, or should not, be included in an assembly. The use of pre-built assemblies for deployment provides a number of advantages that reduce operational costs and complexity, including:

Ability to easily replicate assemblies in production, even allowing for variations of the assembly without adding complexity.

Reduced risk of configuration errors as assemblies are moved between development, test and production environments.

Replicated environments facilitate high-level standardization and consistency across application infrastructures, allowing for simple implementation of best practices.

Accelerated deployment of new infrastructures and applications.

The virtual assembly builder allows for the composition of appliances, and endpoint mapping of externalized systems and other larger non-virtual appliance-based systems such as databases and identity management servers. To support this, the virtual assembly builder includes a visual or graphical user interface environment, command line interface, and supporting infrastructure, that enables the user to construct and deploy assemblies encompassing those components and systems that make up a complex application structure or infrastructure, including the following capabilities:

Ability to browse a catalog of existing appliances and assemblies allowing for simple re-use of existing infrastructure.

Assembly editor that enables declarative composition of new assemblies based on existing appliances and external systems.

Ability to modify connections between appliances using drag-and-drop.

Property inspector that displays the editable properties of appliances and assemblies.

Ability to create templatized definitions of complete configurations, allowing for simple deployment.

Single-step deployment of virtualized multi-tier applications onto a pool of virtualized resources.

In accordance with an embodiment, the virtual assembly builder is used as part of a four-step (phase) process, including introspection, configuration, preparation, and deployment phases.

During the introspection phase, necessary metadata and configuration information is captured, from an existing (reference) deployment, for all of the components that make up appliances within an assembly. Target components can reside locally, or remotely on multiple distributed systems that may be physical or virtual.

During the configuration phase, relationships are established among the appliances and any external resources, by use of a graphical user interface to drag-and-drop components, assemblies, and appliances maintained in a catalog; establish relationships and connections between appliances, automatically checking for protocol compatibility; and create connections from appliances to external resources such as database, security provider, or messaging, that are not included within the assembly.

During the preparation phase, those deployment artifacts necessary for the assembly and relevant to the particular virtualization platform are created, including creating bootable virtual machine disk images with customized operating system distributions and configurable metadata allowing for deploy-time customization of the software component. Appliances that contain Java applications can be further optimized, e.g., by incorporating a high-performance Java virtual machine (JVM) designed to run in a virtual environment without the overhead of a general-purpose operating system.

Finally, during the deployment phase, the virtual assembly builder is used to deploy the assembly into a target environment, including discovering resource pools available on virtualized environments by establishing authenticated connections directly with a virtual machine manager; staging appliance disk images and deploying entire assemblies onto resource pools in a single step; creating customized deployment configurations for assemblies that override base configuration properties for appliances within the assembly; accommodating late-binding appliances automatically through deployment-specific customization; scaling appliance instances after initial deployment of an assembly; and automatically wiring the newly deployed instances into the existing assembly.

Generally, the virtual assembly builder does not itself include the ability to administer the components, and does not replace the administrative tools supplied with them, nor does the virtual assembly builder itself supply the virtual environment into which the assemblies are ultimately deployed.

In accordance with an embodiment, a minimal appliance comprises a metadata (name and value pairs) describing the condition of the original component, together with a set of component-specific files that allow its configuration to be recreated at deployment time. During the course of preparing the appliance for deployment into the target environment, additional configuration information can be created and stored along with the metadata. The appliance metadata includes a description of each of the component's logical inputs and outputs, collectively called endpoints. For example, the Hypertext Transfer Protocol (HTTP) input of an Oracle HTTP Server component is an example of an input endpoint; while the mod_wl_ohs output of the same Oracle HTTP Server component is an example of an output endpoint. In this example, the metadata describing endpoints includes, e.g., protocols, port numbers, and URLs. The virtual assembly builder captures enough information about each endpoint to allow the connection to be updated after the component is captured and before it is deployed. This allows the virtual assembly builder to ensure that appliances will connect correctly within the deployment environment.

In accordance with an embodiment, external appliances are provided as virtual machine templates that the user can import as appliances into the catalog. Once imported, external appliances can be edited, added and deployed as part of any assembly, as with any other appliance.

During the introspection phase, the virtual assembly builder creates a snapshot of each component's configuration at the time of introspection (e.g., as an Extensible Markup Language, XML configuration file). In accordance with an embodiment, the introspection functionality of the virtual assembly builder can be plug-in based, including a plug-in for each supported component type. In most cases, the result of introspecting a component is an appliance. However, in some instances, e.g., when the virtual assembly builder is used to introspect an Oracle WebLogic server domain, the plug-in generates an assembly containing several appliances, e.g., one appliance representing the domain's administration server, and other appliances representing each of the domain's managed servers.

In accordance with an embodiment, the virtual assembly builder can introspect components on a local host, or components located on remote, network-accessible hosts, and can use industry-standard protocols (e.g., the SSH File Transfer Protocol) to transport the introspection engine to the remote host, and return the introspection results. All of the introspection results are stored locally in the catalog. The user can specify the location of the catalog within the file system using environment variables, e.g., with assembly and appliance metadata stored in nested directories within a metadata subfolder of the catalog root directory, and additional artifacts required for deployment stored in other subdirectories.

As described above, when defining an assembly, it may be necessary to make reference to servers that lie outside it. For example, a particular environment may include database, identity management, or other servers that are shared by many unrelated virtual deployments, and it may be undesirable or impossible to include these systems within any specific assembly. To address this, the virtual assembly builder enables defining external components representing server resources that exist in the reference environment and that will not be deployed as appliances. Representing these components as external resources ensures that referencing appliance(s) within the assembly are correctly configured at deployment time, making it unnecessary to manually correct their network configuration after they are deployed to the virtual environment.

The introspection process is designed to capture the condition of a component and generate a metadata description of the actual component installation. Introspection does not capture the executables, shared libraries or other binaries of the component, but instead generates package definitions that specify one or more file system hierarchies that must be captured in order to reproduce the same component installation in the deployment environment. After the introspection is complete, the virtual assembly builder can be used to package/capture a copy of the actual installation described by the metadata.

In accordance with an embodiment, a virtual machine template is a pre-configured virtual image that requires customization to create multiple running virtual machine images. These templates can be used to create and start new virtual machines in virtualized environments. In most cases, templates are made available to the virtualized environment by registering them to that environment. In order to execute an appliance, templates must be created for the appliance. The appliance templates contain a guest operating system and the introspected appliance.

In accordance with an embodiment, resource managers define and maintain a collection of virtualized hardware resources. These environments generally have the resources partitioned into pools called resource pools. A single resource manager may include multiple pools.

In accordance with an embodiment, deployment plans are used to customize assemblies prior to deployment. The user can use a deployment plan to customize the default assembly and appliance properties, or to specify required overrides and optional overrides. At deployment time, the user can choose the assembly to be deployed, one of its deployment plans, and the resource manager and pool to which the assembly will be deployed. This information is used by the virtual assembly builder to connect to the pool, select the necessary templates, and create virtual machine instances.

In accordance with an embodiment, upon deployment, a target quantity of virtual machines can be started. Deployment of an assembly may transition through various phases, including Staged, Deployed, and Failed, each of which phases allows a subset of operations. For example, when an assembly is deployed, the user may start and stop the virtual machines, or increase or decrease the number of virtual machines associated with that deployed assembly. The virtual assembly builder does not monitor the health of the deployed application; it will only report whether or not an assembly is deployed or staged, as well as the success or failure of a deployment-related operation.

Virtual Assembly Builder Studio

Figure 2:
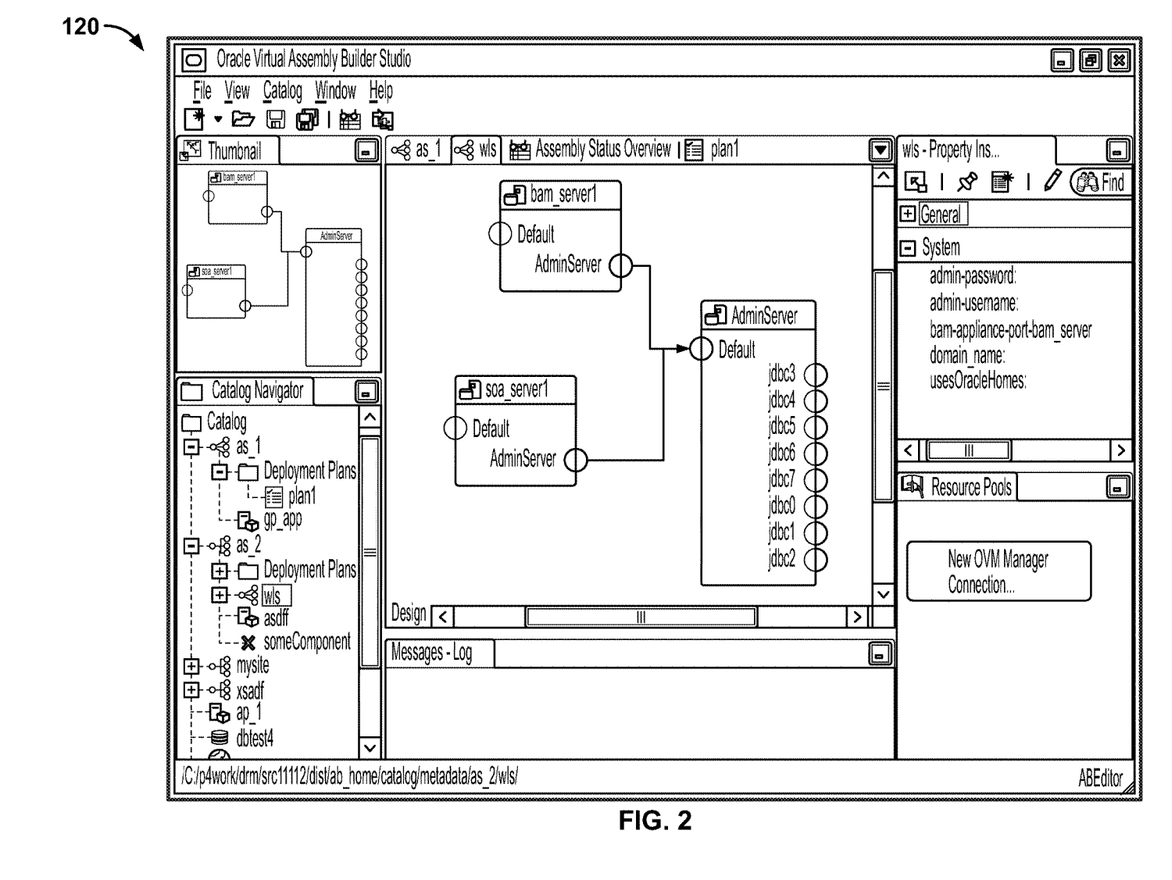
FIG. 2 shows an illustration of a studio console or graphical user interface, for use with a virtual assembly builder environment, in accordance with an embodiment.
Figure 3:
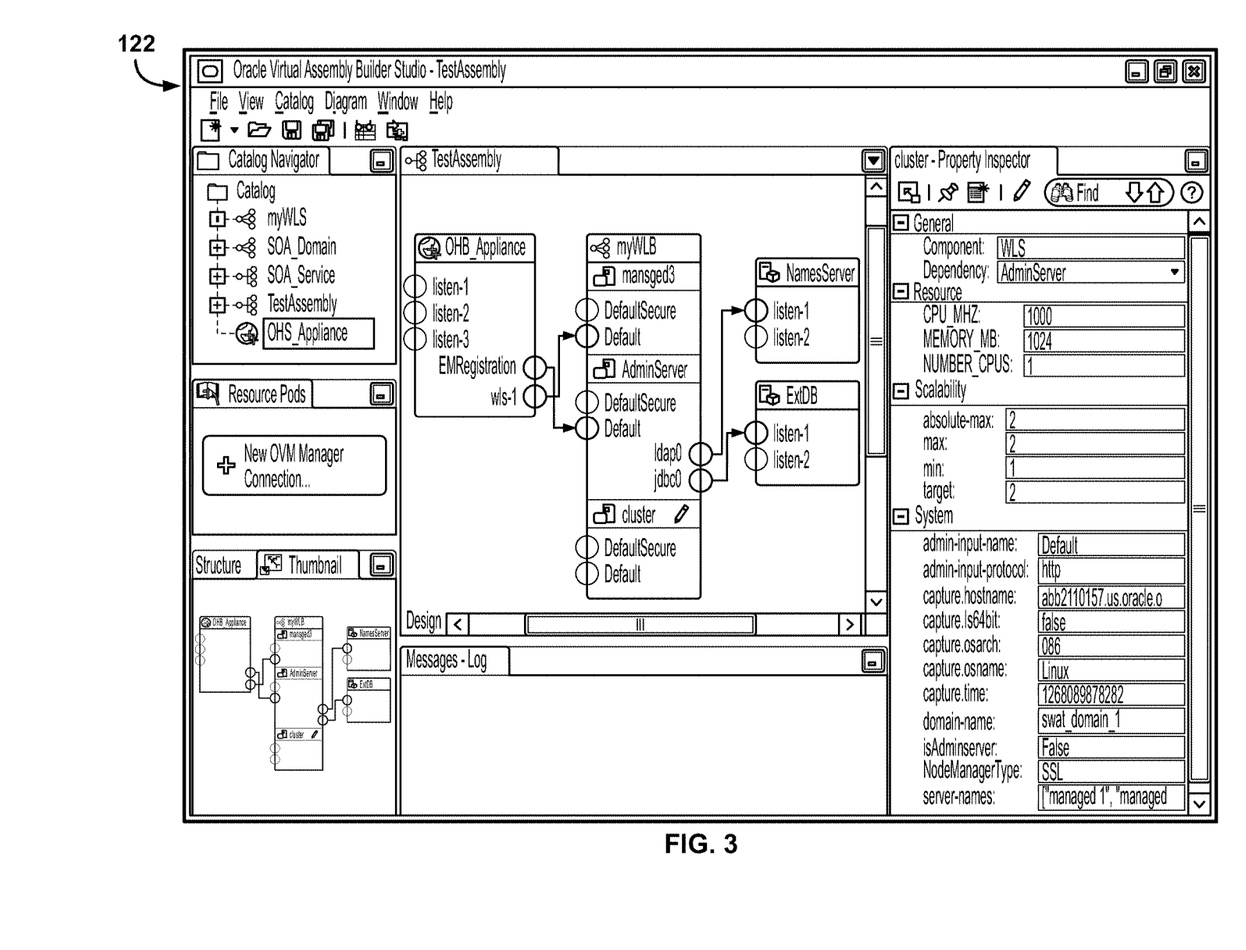
FIG. 3 shows an illustration of a studio console or graphical user interface, for use with a virtual assembly builder environment, in accordance with an embodiment.

FIG. 2 shows an illustration of a studio console or graphical user interface 120, for use with a virtual assembly builder environment, in accordance with an embodiment; while FIG. 3 shows an illustration of a studio console or graphical user interface 122 in accordance with an alternative embodiment. A user can use the virtual assembly builder in a variety of different ways, including:

Basic introspect-editing-template creation-deploy cycle. The user installs and configures reference systems, then uses the virtual assembly builder to introspect the reference systems, create an assembly to represent the topology, create templates for the assembly, then deploys the assembly.

Additional post-deployment configuration. After the basic workflow above, the user performs more configuration and binary changes in the deployed environment. The user then goes through the introspect-edit-template creation-deploy cycle again, as described above.

Starting with pre-built appliances and assemblies. The user downloads pre-built appliances and assemblies provided by his/her own IT organization or another party. The user then uses the virtual assembly builder to deploy these assemblies, and configure the deployed environment as needed. The user then goes through introspect-editing-template creation-deploy cycle again, as described in the basic cycle above.

Figure 4:
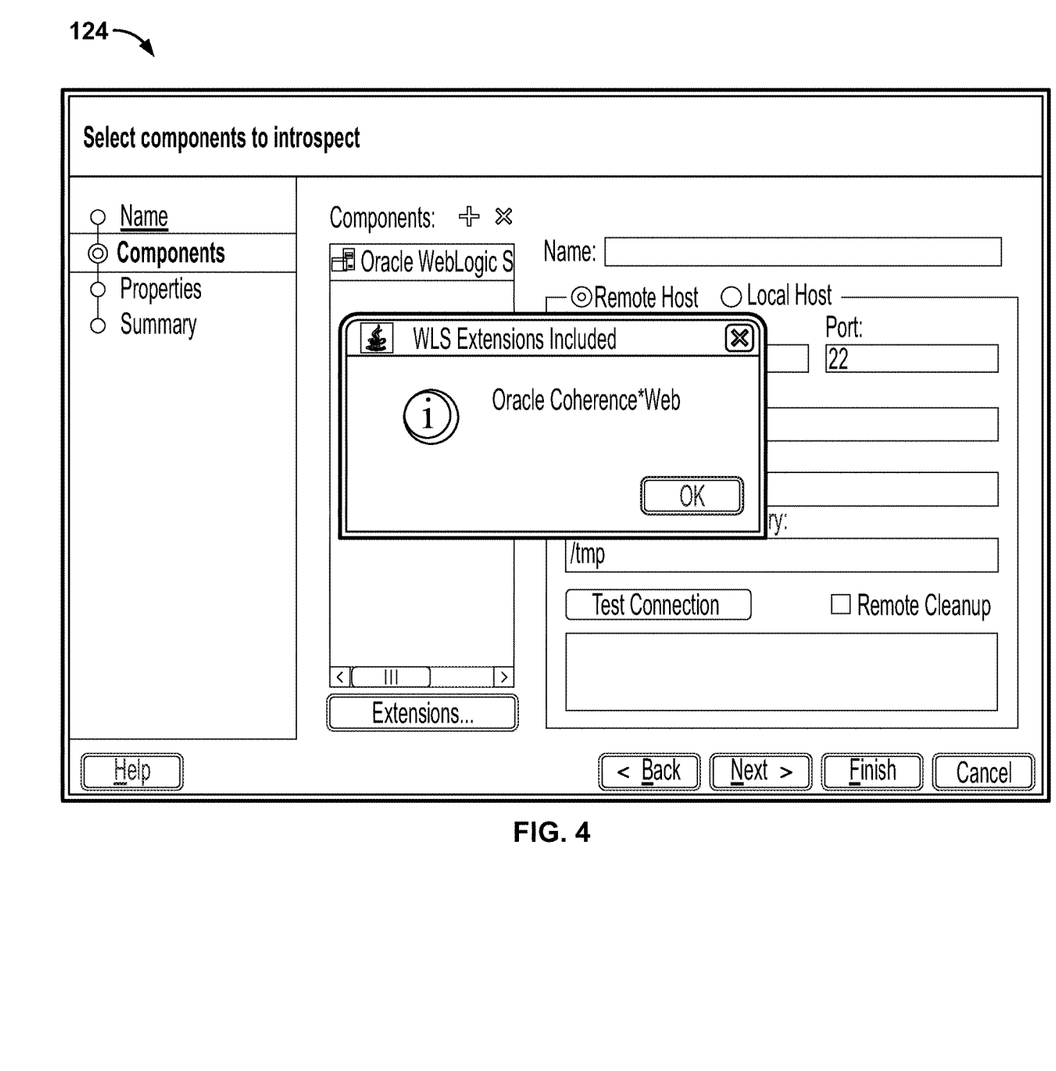
FIG. 4 shows an illustration of a introspection screen, for use with a virtual assembly builder environment, in accordance with an embodiment.

FIG. 4 shows an illustration of an introspection screen 124, for use with a virtual assembly builder environment, in accordance with an embodiment. The introspection operation results in appliance(s) and/or an assembly being created in the catalog. During introspection, the metadata for appliances and assemblies is created in a $AB_INSTANCE/catalog/metadata directory. A unique ID (called the capture ID or cid) is generated for each appliance or assembly, and is stored in its metadata. In addition, a package definition is created in a shared area of the catalog. As shown in FIG. 4, the introspection screen can display a list of components that are supported for introspection (e.g., Oracle Database; Oracle HTTP Server), and the user can click the extensions button to see a list of included extensions for the selected type (that will automatically get executed).

Figure 5:
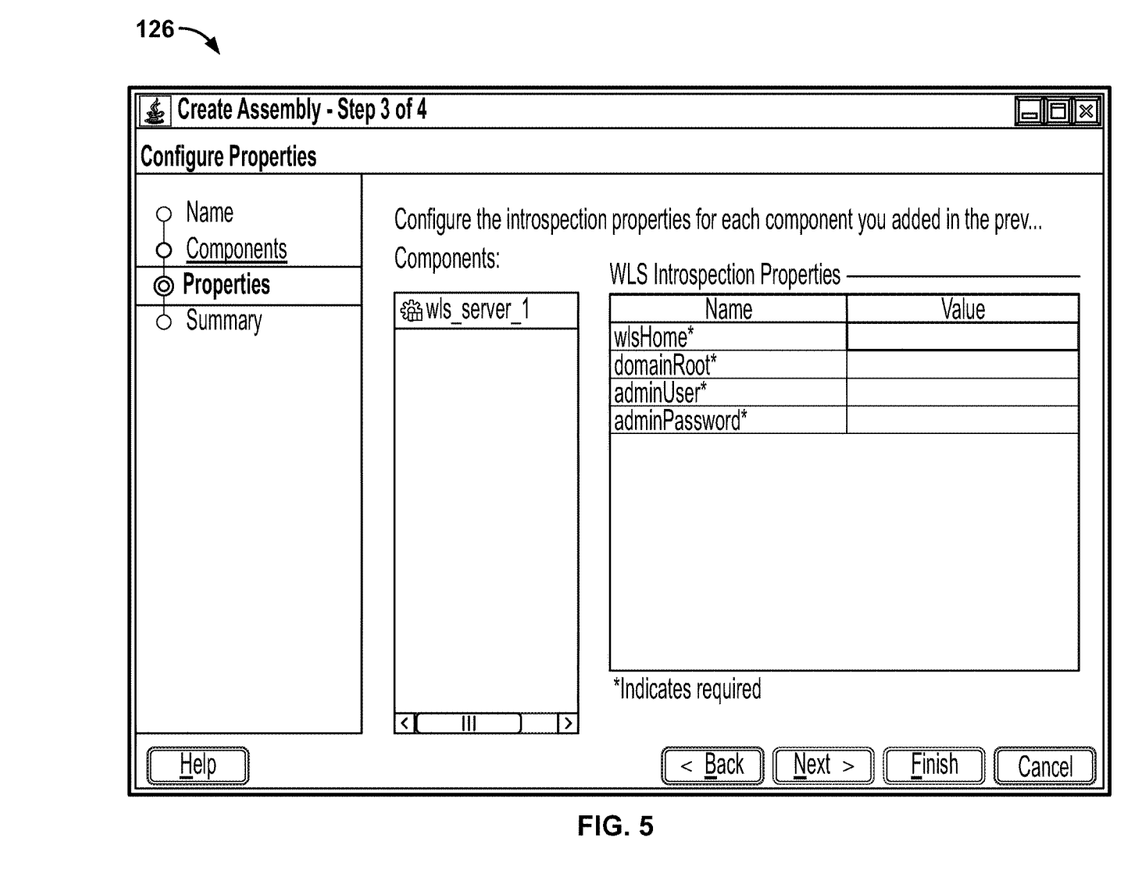
FIG. 5 shows an illustration of a properties configuration screen, for use with a virtual assembly builder environment, in accordance with an embodiment.

FIG. 5 shows an illustration of a properties configuration screen 126, for use with a virtual assembly builder environment, in accordance with an embodiment. As shown in FIG. 4, the user can set the introspection properties for the components included for introspection. Required properties are identified with an asterisk next to the property name. A packaging step takes the package definitions generated from introspection, archives these packages into one or more zip (or other raw) files and stores the resulting files in a $catalog/bundles/$cid directory. The cid is the capture ID for the packaged appliance or assembly, created during introspection.

Figure 6:
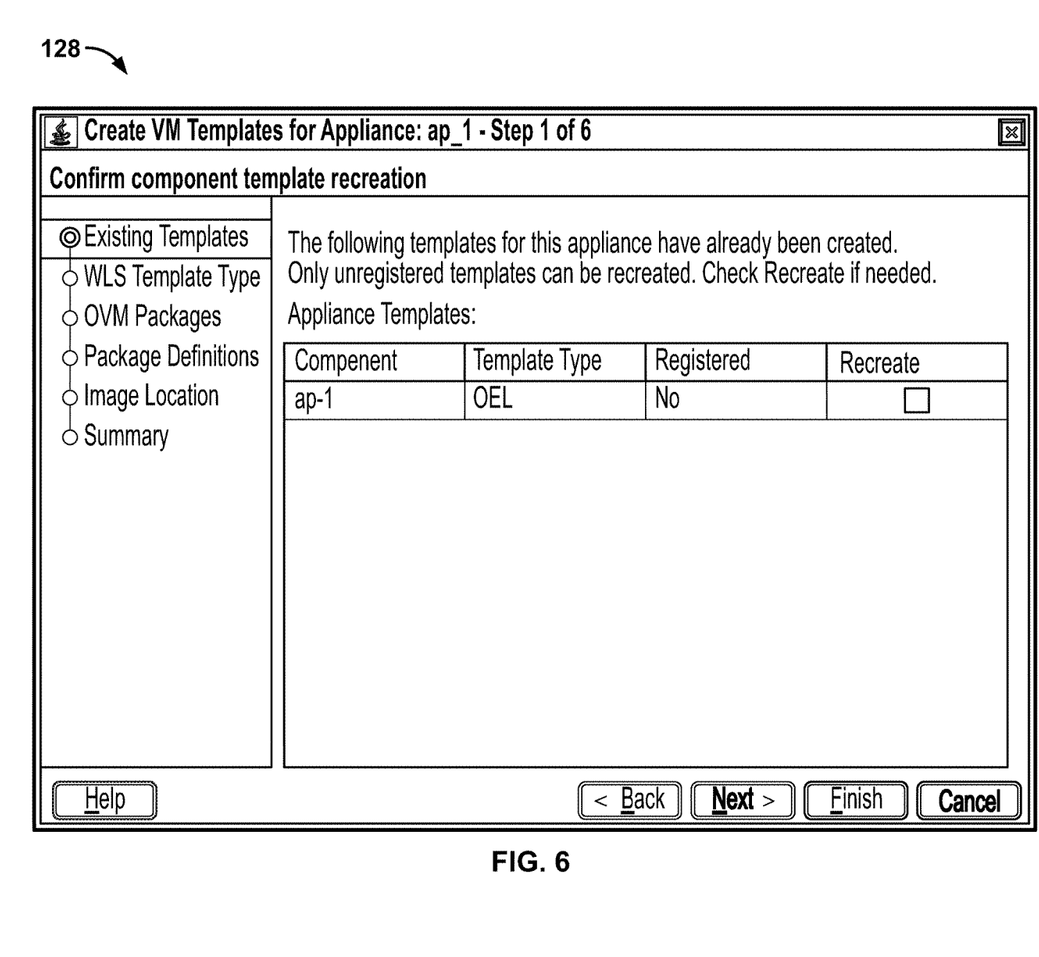
FIG. 6 shows an illustration of a template screen, for use with a virtual assembly builder environment, in accordance with an embodiment.

FIG. 6 shows an illustration of a template screen 128, for use with a virtual assembly builder environment, in accordance with an embodiment. Template creation generates virtual machine templates that are ready to be deployed into virtualized platforms. For Oracle WebLogic Server components, the virtual assembly builder supports both Oracle Enterprise Linux and JRockit VE template types. For non-Oracle WebLogic Server components (e.g., Oracle HTTP Server, Oracle Web Cache, or Oracle Database), the Oracle Enterprise Linux template type is supported. To create a template, the user must provide a system base image that contains the operating system. The user may create their own system base image if the base image provided with the system does not meet their needs. After creating an assembly, the assembly may be edited before deployment to create connections, and optionally, make other changes.

Figure 7:
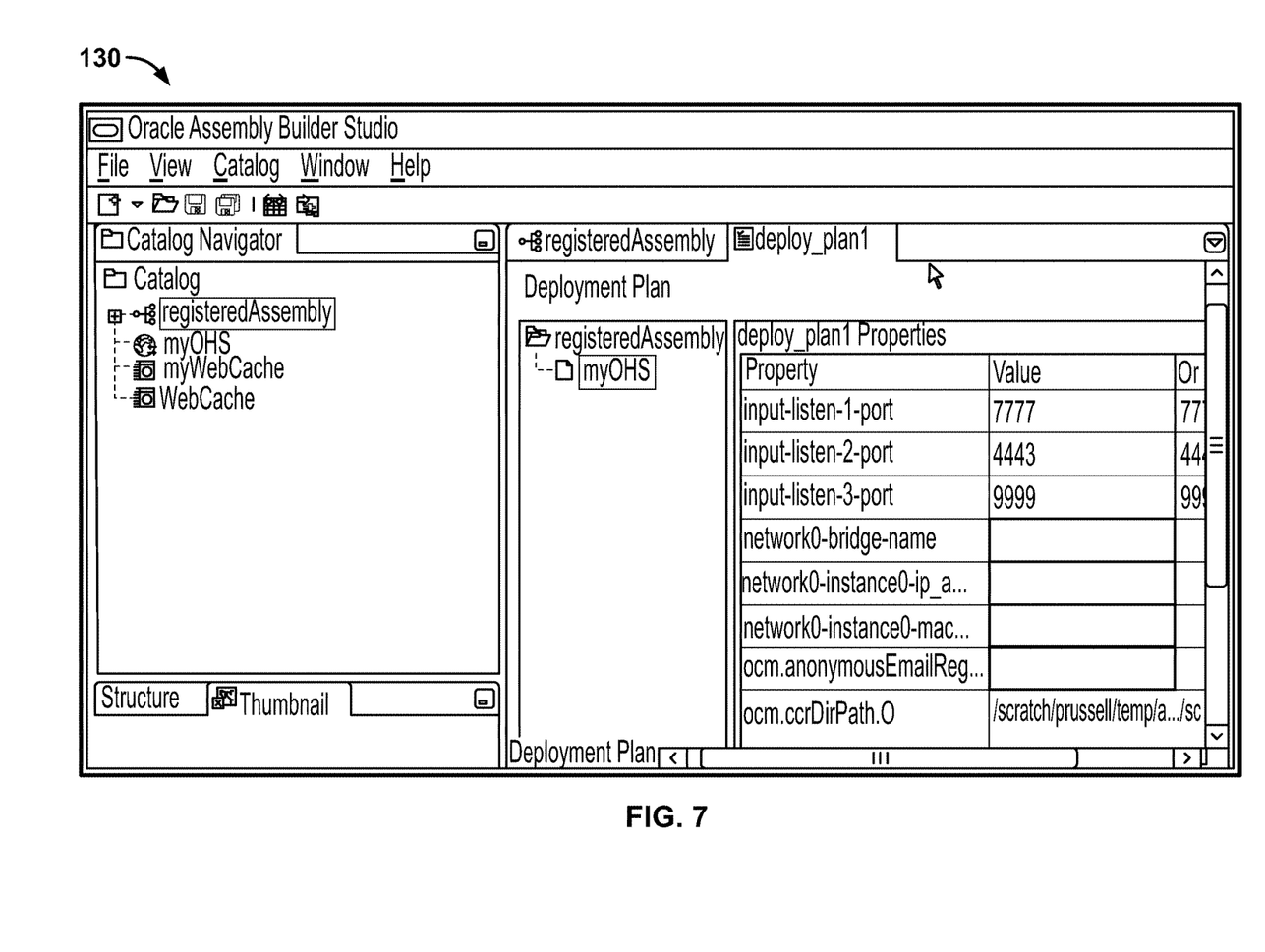
FIG. 7 shows an illustration of a deployment plan screen, for use with a virtual assembly builder environment, in accordance with an embodiment.

FIG. 7 shows an illustration of a deployment plan screen 130, for use with a virtual assembly builder environment, in accordance with an embodiment. A deployment plan allows the user to override the default metadata of the assembly. As shown in FIG. 7, the user can specify a plan by selecting an assembly in the catalog and selecting the deployment plan screen, which displays the original property values (Original column) and the new property values (Value column), with the original value being the value that existed on the reference system. The user can then set the properties as required.

Figure 8:
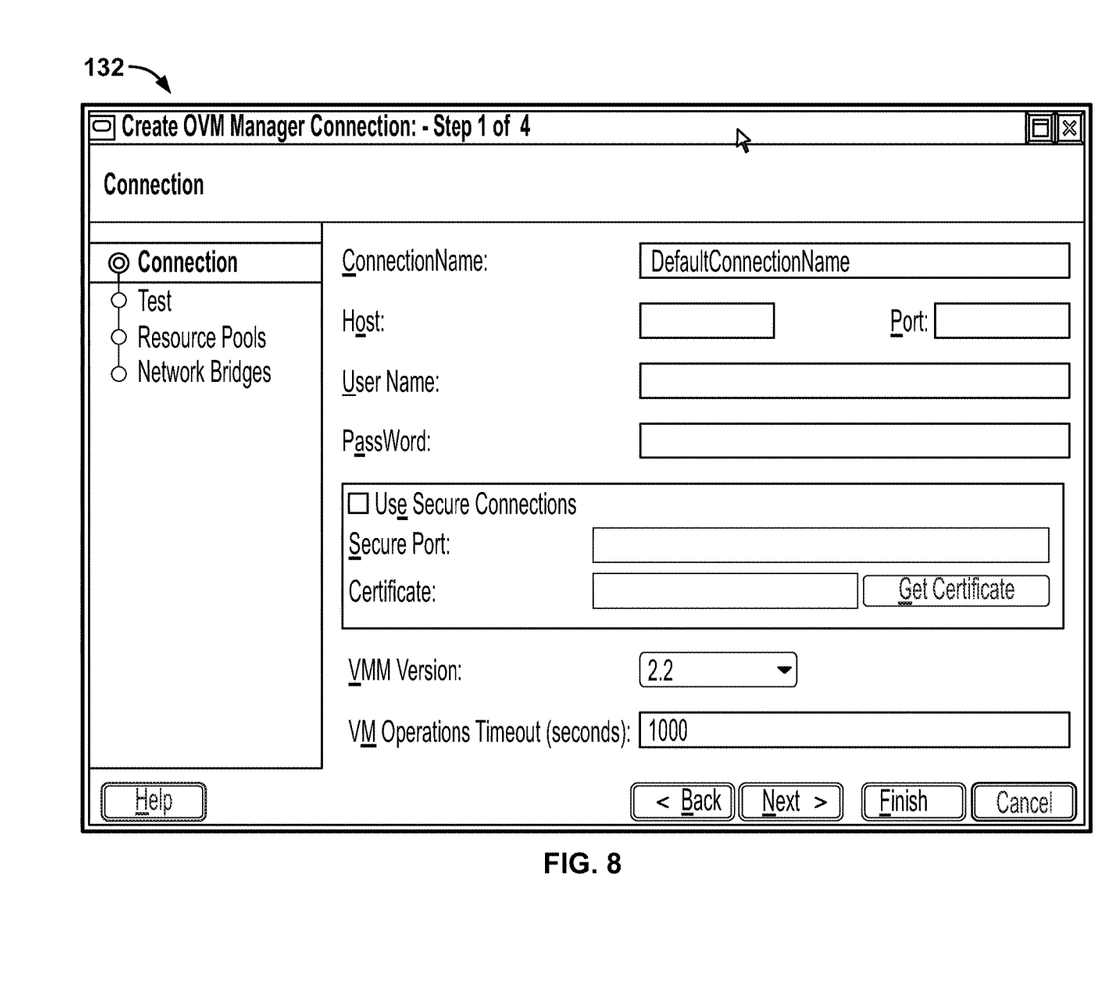
FIG. 8 shows an illustration of a resource pool connection screen, for use with a virtual assembly builder environment, in accordance with an embodiment.

FIG. 8 shows an illustration of a resource pool connection screen 132, for use with a virtual assembly builder environment, in accordance with an embodiment. The user can define a connection to, e.g., an Oracle VM manager, query for resource pools, and make the product aware of the pools by using the Create Oracle VM Connection Manager wizard to configure them. Once the resource pools have been configured, the user can register the templates for assemblies that need to be deployed. During deployment, the user can deploy an assembly by selecting the assembly, the deployment plan, the resource manager, and the resource pool in the selected resource manager. The resource pool is optional and if one is not specified, a default pool for the specified resource manager is used. When an assembly is deployed, virtual machines for the assembly are created and started, and applications within the virtual machines are also started. Once the user has created a deployment plan, they can deploy an assembly by, e.g., selecting Deploy to Oracle VM from the Assembly Node Context Menu.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for virtualizing installed components in a reference environment, comprising:
   a computer that includes one or more microprocessors;
   a virtual assembly builder, executing on the computer, for use with a reference environment including a plurality of installed software components, wherein the virtual assembly builder includes a graphical user interface and a plurality of plug-ins, each plug-in provided for introspecting a different type of installed software component in the reference environment;
   wherein the virtual assembly builder is configured to
      generate, for each of the plurality of installed software components in the reference environment, a metadata description that specifies one or more files, including at least an executable, that need to be captured for reproducing an installation of that software component in a virtualized target environment,
      capture, using a corresponding plug-in, each of the plurality of installed software components from the reference environment into a software appliance in accordance with the metadata description of that installed software component,
      store the software appliance into a catalog associated with the virtual assembly builder,
      retrieve, via the graphical user interface, a plurality of software appliances from the catalog and group the software appliances into a software assembly by defining connections between the software appliances based on a deployment plan,
      receive, from a user, a selection of the software assembly, and a virtualized resource pool from a plurality of virtualized resource pools available in the virtualized target environment,
      connect to the selected virtualized resource pool, and deploy the selected software assembly as a single unit onto the selected virtualized resource pool in the virtualized target environment using the deployment plan;

select a virtual machine template based on the user's selection of the software assembly and the virtualized resource pool; and create and start, using the selected virtual machine template, one or more virtual machines to execute the deployed software assembly.

2. The system of claim 1, wherein the graphical user interface is further used to establish relationships between a software appliance and one or more external resources.

3. The system of claim 1, wherein the deployment plan includes configurations for the software assembly that override base configuration properties for each software appliance in the software assembly, and/or accommodate late-binding or scalability of the software appliances.

4. The system of claim 1, wherein the installation of each of the installed software components includes one or more executables, and one or more shared libraries.

5. The system of claim 1, wherein the software assembly includes one or more virtual machine disk images for deployment to a particular virtualization platform, wherein the disk images include deployment artifacts necessary for the software assembly.

6. The system of claim 1, wherein the virtualized resource pool is discovered through a virtual machine manager in the virtualized target environment.

7. The system of claim 1, wherein the wherein the plurality of installed software components in the reference environment are located on one or more hosts selected from group consisting of a local host, and a remote network-accessible host.

8. The system of claim 7, wherein the virtual assembly builder uses a particular protocol to transport an introspection engine to a remote network-accessible host, and returns a software appliance, or a software assembly if a plurality of software components to be introspect are installed in an application server domain.

9. A method for virtualizing installed components in a reference environment, comprising:

providing a virtual assembly builder for use with a reference environment including a plurality of installed software components, wherein the virtual assembly builder includes a graphical user interface and a plurality of plug-ins, each plug-in provided for introspecting a different type of installed software component in the reference environment;

generating, for each of the plurality of installed software components in the reference environment, a metadata description that specifies one or more files, including at least an executable, that need to be captured for reproducing an installation of that software component in a virtualized target environment;

capturing, using a corresponding plug-in, each of the plurality of installed software components from the reference environment into one of a plurality of software appliances in accordance with the metadata description of that installed software component;

storing the software appliance into a catalog associated with the virtual assembly builder;

retrieving, via the graphical user interface, the plurality of software appliances, wherein the plurality of software appliances are grouped into a software assembly by defining connections between the software appliances based on a deployment plan;

receiving, from a user, a selection of the software assembly, and a virtualized resource pool from a plurality of virtualized resource pools available in the virtualized target environment; and connecting to the selected virtualized resource pool, and deploying the selected software assembly as a single unit onto a virtualized resource pool in the virtualized target environment;

selecting, by the virtual assembly builder, a virtual machine template based on the user's selection of the software assembly and the virtualized resource pool; and creating and starting, using the selected virtual machine template, one or more virtual machines to execute the deployed software assembly.

10. The method of claim 9, wherein the graphical user interface is further used to establish relationships between a software appliance and one or more external resources.

11. The method of claim 10, wherein the installation of each of the installed software components includes one or more executables, and one or more shared libraries.

12. The method of claim 10, wherein the software assembly includes one or more virtual machine disk images for deployment to a particular virtualization platform, wherein the disk images include deployment artifacts necessary for the software assembly.

13. The method of claim 10, wherein the virtualized resource pool is discovered through a virtual machine manager in the virtualized target environment.

14. The method of claim 9, wherein the wherein the plurality of installed software components in the reference environment are located on one or more hosts selected from group consisting of a local host, and a remote host network-accessible.

15. The method of claim 14, wherein the virtual assembly builder uses a particular protocol to transport an introspection engine to a remote network-accessible host, and returns a software appliance, or a software assembly if a plurality of software components to be introspect are installed in an application server domain.

16. The method of claim 9, wherein the deployment plan includes configurations for the software assembly that override base configuration properties for each software appliance in the software assembly, and/or accommodate late-binding or scalability of the software appliances.

17. A non-transitory computer readable storage medium including instructions stored thereon which, when read and executed by a computer, cause the computer to perform a method for virtualizing installed components in a reference environment, comprising:

configuring a virtual assembly builder for use with a reference environment including a plurality of installed software components, wherein the virtual assembly builder includes a graphical user interface and a plurality of plug-ins, each plug-in provided for introspecting a different type of installed software component in the reference environment;

generating, for each of the plurality of installed software components in the reference environment, a metadata description that specifies one or more files, including at least an executable, that need to be captured for reproducing an installation of that software component in a virtualized target environment;

capturing, using a corresponding plug-in, each of the plurality of installed software components from the reference environment into one of a plurality of software appliances in accordance with the metadata description of that installed software component;

storing the software appliance into a catalog associated with the virtual assembly builder;

retrieving, via the graphical user interface, the plurality of software appliances, wherein the plurality of software appliances are grouped into a software assembly by defining connections between the software appliances based on a deployment plan;

receiving, from a user, a selection of the software assembly, and a virtualized resource pool from a plurality of virtualized resource pools available in the virtualized target environment; and connecting to the selected virtualized resource pool, and deploying the selected software assembly as a single unit onto a virtualized resource pool in the virtualized target environment;

selecting, by the virtual assembly builder, a virtual machine template based on the user's selection of the software assembly and the virtualized resource pool; and creating and starting, using the selected virtual machine template, one or more virtual machines to execute the deployed software assembly.

18. The non-transitory computer readable storage medium of claim 17, wherein the graphical user interface is further used to establish relationships between a software appliance and one or more external resources.

19. The non-transitory computer readable storage medium of claim 17, wherein the deployment plan includes configurations for the software assembly that override base configuration properties for each software appliance in the software assembly, and/or accommodate late-binding or scalability of the software appliances.

20. The non-transitory computer readable storage medium of claim 17, wherein the installation of each of the installed software components includes one or more executables, and one or more shared libraries.

21. The non-transitory computer readable storage medium of claim 17, wherein the virtualized resource pool is discovered through a virtual machine manager in the virtualized target environment.

22. The non-transitory computer readable storage medium of claim 17, wherein the wherein the plurality of installed software components in the reference environment are located on one or more hosts selected from group consisting of a local host, and a remote network-accessible host.

23. The non-transitory computer readable storage medium of claim 22, wherein the virtual assembly builder uses a particular protocol to transport an introspection engine to a remote network-accessible host, and returns a software appliance, or a software assembly if a plurality of software components to be introspect are installed in an application server domain.

* * * * *

UNITED STATES PATENT AND TRADEMARK OFFICE
CERTIFICATE OF CORRECTION

PATENT NO. : 9,612,803 B2  
APPLICATION NO. : 13/448111  
DATED : April 4, 2017  
INVENTOR(S) : Mousseau et al.

Page 1 of 1

It is certified that error appears in the above-identified patent and that said Letters Patent is hereby corrected as shown below:

In the Claims

In Column 9, Line 30, in Claim 7, delete "wherein the wherein the" and insert -- wherein the --, therefor.

In Column 10, Line 31, in Claim 14, delete "wherein the wherein the" and insert -- wherein the --, therefor.

In Column 12, Line 16, in Claim 22, delete "wherein the wherein the" and insert -- wherein the --, therefor.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*